Patented Mar. 23, 1954

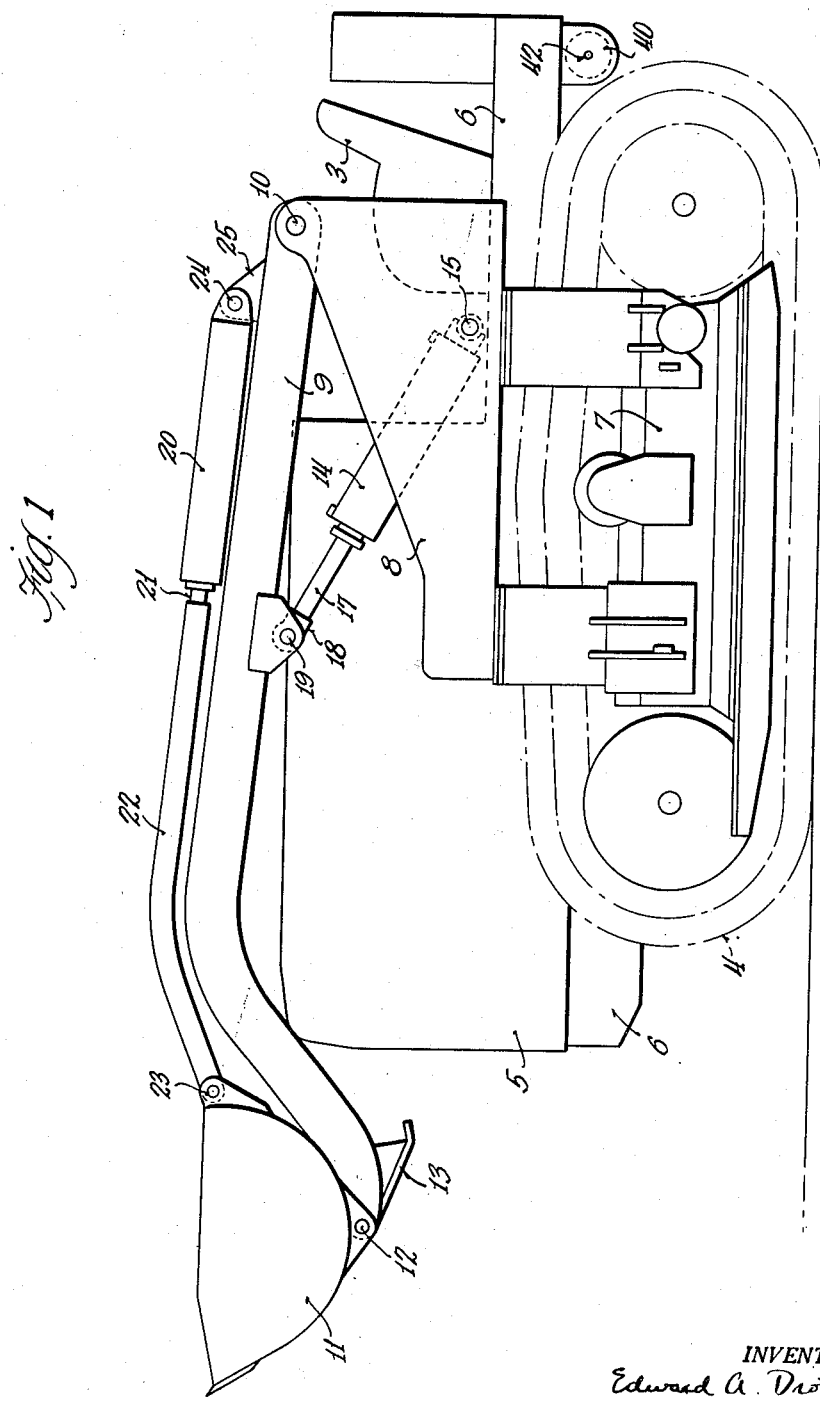

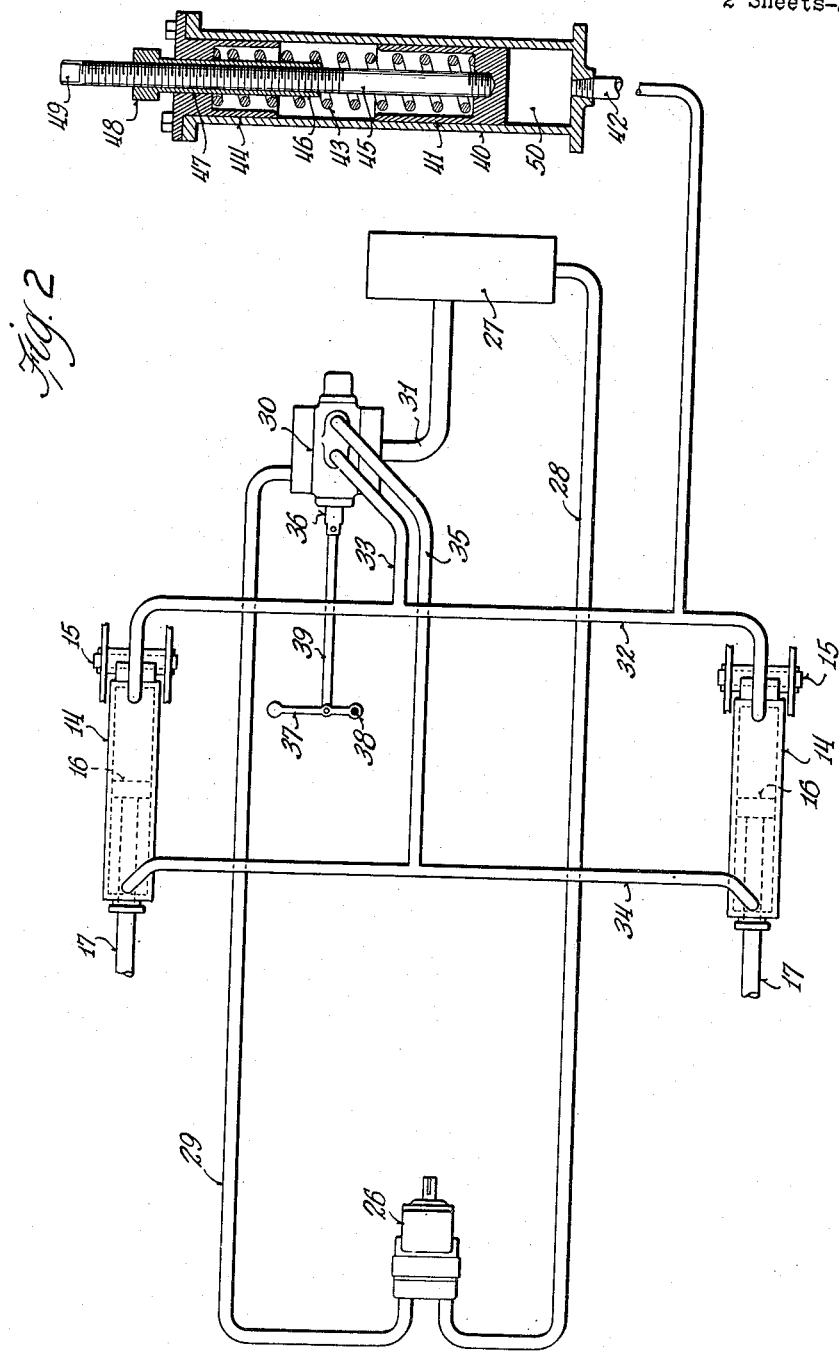

2,672,995

UNITED STATES PATENT OFFICE 2,672,995

LOAD HANDLING APPARATUS

Edward A. Drott, Wausau, Wis.

Continuation of application Serial No. 574,505, January 25, 1945. This application May 22, 1953, Serial No. 356,990

1 Claim. (Cl. 214—140)

This application is a continuation of application S. N. 574,505, filed January 25, 1945, and now abandoned in favor of this application.

The invention relates to load handling apparatus.

In many types of load handling equipment heavy loads have to be transported over uneven ground which causes jolting of the load, and the jolting shocks are transmitted directly to the transporting apparatus and to the operator of such apparatus. The object of the present invention is to provide a hydraulically operated cushioning mechanism associated with the hydraulic support handling the load which practically eliminates these shocks to the transporting vehicle and to the operator of such vehicle, thus decreasing wear on the vehicle, decreasing maintenance expense, and increasing life of the hydraulic equipment, and reducing fatigue to the operator due to such shocks.

The invention further consists in the several features hereinafter described and more particularly defined by claims at the conclusion hereof.

In the drawings:

Fig. 1 is an elevation view of a load handling apparatus equipped with a device embodying the invention;

Fig. 2 is a diagrammatic view of the hydraulic system used in Fig. 1 and including the cushioning device embodying the invention.

As illustrative of a type of load handling apparatus to which this invention may be applied, I show in Fig. 1 a self-propelled transporting vehicle 3, embodying endless propelling treads 4 connected in any conventional or suitable manner with the engine or prime mover 5 mounted on the frame 6 of the vehicle. Also shown associated with the track frame 7 are supporting brackets 8 on opposite sides of the vehicle (only one being shown) forming mountings for a pair of load carrying arms 9 pivoted thereto at 10. The arms 9 project out in front of the vehicle and at the outer ends of these arms a digging bucket or shovel 11 is pivotally mounted at 12. The outer ends of the arms 9 are also provided with shoes 13 permitting them to rest on and travel over the ground on which the machine is working.

The arms 9 are adapted to be raised or lowered or held in different positions of adjustment by a pair of hydraulic actuators, one at each side of the vehicle including a double acting cylinder 14 pivotally mounted at one end on a pivot pin 15 on the bracket 8 and having a piston 16 working therein with a piston rod 17 projecting outwardly therefrom and pivotally connected at its outer end 18 by a pivot pin 19 with the arm 9.

For controlling the positioning of the bucket 11 and the dumping of the load, a double acting hydraulic cylinder 20 is pivotally mounted on each of the arms 9, and its operating piston 21 is connected at its outer end to a rod 22 which at its outer end is connected by a pivot pin 23 to the one side of the bucket 11, the cylinder 20 being pivotally connected by a pin 24 to a bracket arm 25 on the arm 9. With such a form of load handling apparatus the movement of the pistons 16 in the cylinders 14 acts to swing the arms downwardly to a load receiving position in which the bucket is in a position to dig or scoop up material during the forward movement of the vehicle and to swing said arms upwardly to a load carrying position in which the arms are held by the hydraulic system and in which position also the bucket may then be tilted to discharge its load through the operation of the hydraulic cylinders 20. In an apparatus of this kind and in many other types of hydraulically operated load handling apparatus, the shocks imparted to the vehicle and through it to the operator as the vehicle travels over uneven ground, or when for any reason the load, which may be the bucket in loaded or unloaded condition, is jolted, are quite severe; in order to eliminate such shocks or other shocks as may be imposed by the load upon the vehicle I provide a cushioning means in the hydraulic system as shown more particularly in Fig. 2. In Fig. 2, the numeral 26 designates a suitable motor driven hydraulic pump receiving operating fluid from a supply tank 27 connected to said pump by a supply pipe 28 and delivering pressure fluid to a pipe or line 29 connecting with a control valve mechanism 30 of any suitable and well known construction from which surplus fluid is carried by a pipe 31 back to the tank 27. The lifting ends of the cylinders 14 are connected by pipes 32 and 33 to one port of the valve mechanism, and the other ends of the cylinders are connected by pipes 34 and 35 to another port of the valve mechanism. The valve 36 which controls these ports may be operated in any suitable manner from a lever 37 pivoted at 38 and operatively connected by a link 39 with the valve 36, the valve 36 as herein shown being a piston type valve that slides in the housing of the valve mechanism 30. Such forms of hydraulic operating circuits are old and well known, and various other circuits including one or more hydraulic cylinders may be used in combination with the cushioning mechanism embodying this invention.

As herein shown, the cushioning mechanism includes a hydraulic cylinder 40, one end of which has a piston 41 working therein and a pipe connection 42 connecting this end of the cylinder with the hoist end of the cylinders 14, that is, to the pipe 32. As a consequence, the piston 41 moves in response to hydraulic pressures existing in the load lifting and supporting hydraulic circuit, and to cushion shocks imposed in this circuit through the jolting of the load I provide a spring 43 interposed between the piston and a head 44 fixed to the other end of the cylinder 40 from that of the pipe connection 42.

For adjusting the load carrying capacity of this spring I provide a threaded adjusting rod 45 secured to the piston 41 and having a complementary threaded sleeve 46 mounted thereon and slidably movable through a bore 47 in the head 44 and provided with an exteriorly disposed wrench engaging head 48, the exposed end of the rod 45 also having a wrench engaging part 49. With this construction initial tensioning of the spring 43 is effected by turning the sleeve 46 relative to the rod, the shouldered head 48 under these conditions then abutting against the fixed head 44 of the cylinder 40. When, however, due to the movement of the piston 41 the spring is further compressed, the sleeve 46 is free to travel or slide outwardly in the head 44 as indicated in the drawings by an outward position there shown. The sleeve also protects the head 44 from wear that might be occasioned by the threads of the rod 45.

With this construction also when due to a jolting of the load, pressure waves are set up in the hydraulic fluid in the lifting ends of the cylinders 14, these pressure waves are transmitted to the chamber 50 of the cylinder 40 and act against the piston 41 and move the same against the compression of the spring 43 which will yield under severe fluctuations of the pressure so as to take up the shocks and in so yielding will eliminate the transfer of these shocks to the vehicle or the operator of the machine.

These shocks are particularly noticeable in load handling devices where the load is being transported over uneven ground, but the cushioning device herein shown and described may be used on other hydraulically operated load suspending equipment where it is desirable to eliminate shocks from load to the load carrying support.

I desire it to be understood that this invention is not to be limited to any particular form or arrangement of parts except in so far as such limitations are included in the claim.

I claim:

In a load handling apparatus, the combination of a self-propelled vehicle which includes a body, a pair of upstanding supporting brackets and a chassis for supporting the body and the brackets, a pair of arms pivoted at their rear ends to the upper part of said brackets at a point well above the level of the horizontal plane through the center of the chassis and extending forwardly for a substantial distance ahead of said body, an earth digging bucket carried on the forward ends of said arms, a pair of hydraulic jacks each including a cylinder and a cooperating piston, said jacks being connected with said brackets and arms, pipes interconnecting said cylinders for applying equalized pressure to the lifting ends of said jacks, a hydraulic cylinder for absorbing shocks, connected to said pipes so as to be responsive to fluctuations in hydraulic pressure in said pair of cylinders, said shock absorbing cylinder including a spring-loaded piston acting in opposition to the hydraulic pressures occurring in said pair of cylinders, said jacks extending forwardly and upwardly from a lower portion of said brackets to said arms when said arms are in raised position, said jacks extending forwardly in a substantially horizontal plane from said lower portion of the brackets to said arms when said arms are lowered to the digging position, said jacks, when in said substantially horizontal position, acting to oppose the major component of the substantially horizontal forces imposed on said bucket and arms during forward digging movement of said apparatus, thereby relieving the body of the apparatus of digging shock forces transmitted along said arms.

EDWARD A. DROTT.

References Cited in the file of this patent

UNITED STATES PATENTS

| Number | Name | Date |
|---|---|---|
| 1,898,694 | Sikorsky | Feb. 21, 1933 |
| 2,019,938 | Stephens | Nov. 5, 1935 |
| 2,300,801 | Parker | Nov. 3, 1942 |
| 2,312,389 | Cordes | Mar. 2, 1943 |
| 2,312,390 | Cordes | Mar. 2, 1943 |